(12) United States Patent
Sun et al.

(10) Patent No.: US 12,361,002 B2
(45) Date of Patent: Jul. 15, 2025

(54) HIGH-PERFORMANCE LARGE OBJECT OPERATIONS

(71) Applicant: INTERNATIONAL BUSINESS MACHINES CORPORATION, Armonk, NY (US)

(72) Inventors: Shen Yan Sun, Beijing (CN); Peng Hui Jiang, Beijing (CN); Xiao Xiao Chen, Beijing (CN); Xiao Hui Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/464,753

(22) Filed: Sep. 11, 2023

(65) Prior Publication Data

US 2025/0086181 A1   Mar. 13, 2025

(51) Int. Cl.
G06F 16/30       (2019.01)
G06F 16/22       (2019.01)
G06F 16/2453     (2019.01)

(52) U.S. Cl.
CPC .... G06F 16/24549 (2019.01); G06F 16/2219 (2019.01); G06F 16/24542 (2019.01)

(58) Field of Classification Search
CPC ......... G06F 16/24549; G06F 16/24542; G06F 16/2219
See application file for complete search history.

(56) References Cited

U.S. PATENT DOCUMENTS

| | | | |
|---|---|---|---|
| 6,105,017 A * | 8/2000 | Kleewein | G06F 16/245 |
| 6,243,718 B1 * | 6/2001 | Klein | G06F 16/2228 |
| | | | 707/999.203 |
| 6,343,286 B1 | 1/2002 | Lee et al. | |
| 2013/0117332 A1 | 5/2013 | Wei et al. | |
| 2018/0060362 A1 * | 3/2018 | Chidambaran | G06F 16/2282 |
| 2018/0293277 A1 * | 10/2018 | Koenig | G06F 16/2454 |
| 2019/0102450 A1 | 4/2019 | Liu et al. | |
| 2019/0102476 A1 | 4/2019 | Liu et al. | |
| 2019/0243695 A1 * | 8/2019 | Mittal | G06F 12/0862 |
| 2021/0081421 A1 * | 3/2021 | Liu | G06F 16/221 |

OTHER PUBLICATIONS

"InLine LOBs Improve Performance" IBM Documentation. Mar. 17, 2023. 2 pages.
"Storing LOB Data in a Table" IBM Documentation. Feb. 7, 2023. 4 pages.
"Work File Database Storage Requirements" IBM Documentation. Mar. 14, 2023. 5 pages.

* cited by examiner

*Primary Examiner* — Khanh B Pham
(74) *Attorney, Agent, or Firm* — Lily Neff, Esq.; Rachel L. Pearlman, Esq.; Heslin Rothenberg Farley & Mesiti P.C.

(57) ABSTRACT

Computer implemented methods, systems, and computer program products include program code executing on a processor(s) obtains a given query referencing a LOB. The program code obtains statistics and activities performed in the database system, establishes performance benchmarks, and analyzes the given query to determine how the LOB is utilized. The program code determines that meeting a benchmark requires replacing a reference to the LOB with a reference to implicit column(s). The program code executes the given query by referencing the implicit column(s) to obtain query results. The program code returns the query results.

18 Claims, 7 Drawing Sheets

HIGH-PERFORMANCE LARGE OBJECT OPERATIONS

BACKGROUND

The present invention relates generally to the field of query optimization in databases and, specifically, to improving the performance of calls to large objects.

Large Objects (LOBs) are a collection of datatypes that is designed to hold a large amount of data. Generally, a LOB can hold up to maximum size ranging from 8 terabytes to 128 terabytes, depending upon how the database in which the object is populated is configured. Admins, users, and applications store data in LOBs to enable manipulation and access of data in the LOBs. LOBs are suitable for both semi-structured and unstructured data. Semi structured data has logical structure that is not typically interpreted by a database (e.g., an Extensible Markup Language (XML) document that is processed by any application or any external services). Unstructured data are not typically interpreted by the database or an application and are not broken down into smaller logical structures (e.g., a photographic image stored as a binary file). LOBs enable storage of data in a database and in operating system files (e.g., table workspace) accessed from the database. Advantages of utilizing LOBs to store data include: 1) providing support to content-rich applications; 2) storing both unstructured and semi structured data in efficient manner; 3) optimizing storage of a large amount of data; and/or 4) providing uniform ways for accessing data stored outside a database or within a database.

There are some drawbacks to LOBs which can adversely affect the performance of a database and the computing system in which the database is a component. Notably, involving LOB columns in a sort can consume file storage and decrease sort performance. When a LOB column is referenced multiple times in a query, retrieving data from LOB table (work)space in response to the query, each time the query references the large object column, when evaluating the large object column, will decrease the query performance.

Artificial intelligence (AI) refers to intelligence exhibited by machines. Artificial intelligence (AI) research includes search and mathematical optimization, neural networks, and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided through the provision of a computer-implemented method for planning and executing a query referencing a large object (LOB) in a database system. The method can include: obtaining, by one or more processors, a given query for execution in the database system, wherein the given query comprises at least one reference to the LOB, obtaining, by the one or more processors, statistics and activities performed in the database system; establishing, by the one or more processors, performance benchmarks for executing queries in the database system based on analyzing the statistics and the activities to set performance, analyzing, by the one or more processors, the given query, to determine how the LOB in the given query is utilized in the given query, determining, by the one or more processors, based on at least one performance benchmark of the performance benchmarks and based on the analyzing of the given query, that meeting the at least one benchmark requires replacing the at least one reference to the LOB with a reference to one or more implicit columns, generating, by the one or more processors, the one or more implicit columns, the one or more implicit columns comprising a portion of the LOB relevant to the given query, executing, by the one or more processors, the given query, wherein the executing comprises the given query referencing the one or more implicit columns to obtain query results for the given query; and returning, by the one or more processors, the query results.

Shortcomings of the prior art are overcome, and additional advantages are provided through the provision of a computer program product for planning and executing a query referencing a large object (LOB) in a database system. The computer program product comprises a storage medium readable by a one or more processors and storing instructions for execution by the one or more processors for performing a method. The method includes, for instance: obtaining, by the one or more processors, a given query for execution in the database system, wherein the given query comprises at least one reference to the LOB; obtaining, by the one or more processors, statistics and activities performed in the database system; establishing, by the one or more processors, performance benchmarks for executing queries in the database system based on analyzing the statistics and the activities to set performance; analyzing, by the one or more processors, the given query, to determine how the LOB in the given query is utilized in the given query; determining, by the one or more processors, based on at least one performance benchmark of the performance benchmarks and based on the analyzing of the given query, that meeting the at least one benchmark requires replacing the at least one reference to the LOB with a reference to one or more implicit columns, generating, by the one or more processors, the one or more implicit columns, the one or more implicit columns comprising a portion of the LOB relevant to the given query, executing, by the one or more processors, the given query, wherein the executing comprises the given query referencing the one or more implicit columns to obtain query results for the given query; and returning, by the one or more processors, the query results.

Shortcomings of the prior art are overcome, and additional advantages are provided through the provision of a system for planning and executing a query referencing a large object (LOB) in a database system. The system includes: a memory, one or more processors in communication with the memory, and program instructions executable by the one or more processors via the memory to perform a method. The method includes, for instance: obtaining, by the one or more processors, a given query for execution in the database system, wherein the given query comprises at least one reference to the LOB, obtaining, by the one or more processors, statistics and activities performed in the database system; establishing, by the one or more processors, performance benchmarks for executing queries in the database system based on analyzing the statistics and the activities to set performance: analyzing, by the one or more processors, the given query, to determine how the LOB in the given query is utilized in the given query; determining, by the one or more processors, based on at least one performance benchmark of the performance benchmarks and based on the analyzing of the given query, that meeting the at least one benchmark requires replacing the at least one reference to the LOB with a reference to one or more implicit columns; generating, by the one or more processors, the one or more implicit columns, the one or more implicit columns comprising a portion of the LOB relevant to the given query; executing, by the one or more processors, the given query, wherein the executing comprises the given query referencing the one or more implicit columns to obtain query results for the given query; and returning, by the one or more processors, the query results.

Computer systems and computer program products relating to one or more aspects are also described and may be claimed herein. Further, services relating to one or more aspects are also described and may be claimed herein.

Additional aspects of the present disclosure are directed to systems and computer program products configured to perform the methods described above. Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
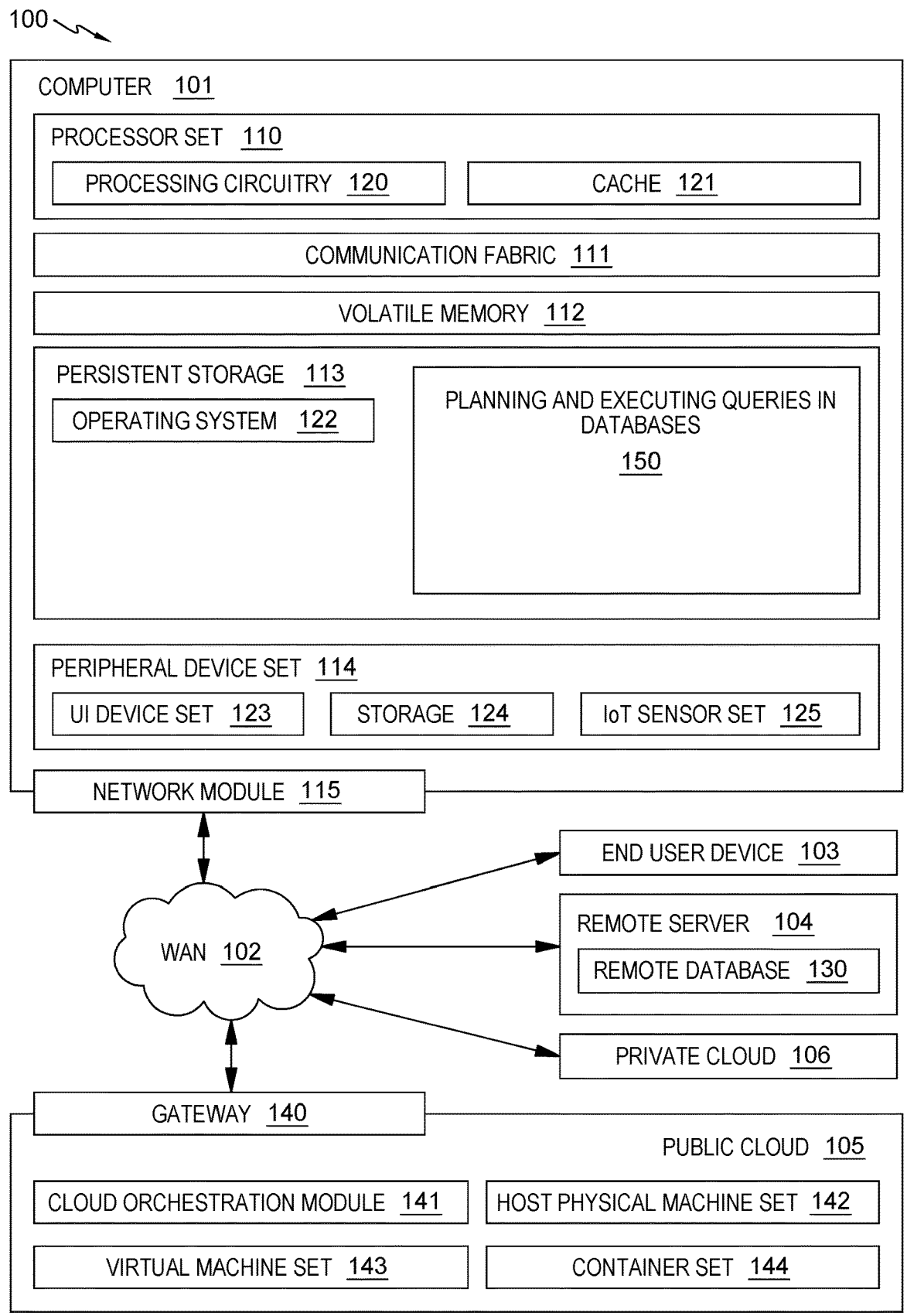
FIG. 1 depicts one example of a computing environment to perform, include and/or use one or more aspects of the present disclosure.

The examples herein include computer-implemented methods, computer program products, and computer systems where program code executing on one or more processors improves query efficiency (and hence, system performance) by analyzing tables and (e.g., structured query language (SQL)) queries which involve LOBs, determining, in each case, how the LOB is utilized, determining whether calling the each LOB directly will adversely affect performance of the system in which the queries are executed, and based on the program code determining that performance would be adversely affected, generating new implicit column to store each LOB. Implicit data means a value of any data type, stored in one column and row intersection whose meaning can only be understood by relating that value to another value in another column and row intersection. Thus, an implicit column in a database is a column that relates to a column (values) at another location, in this case, a LOB column. Aspects of the examples herein improve query and system performance in ways including but not limited to: 1) significantly reducing getPages (command that returns a page of a given path) and central processing unit (CPU) usage, 2) significantly improving select efficiency for LOB; and/or 3) operating in a manner that is transparent to the customer without requiring any changes to the application generating queries that access the database(s).

As will be described in greater detail herein, in the examples herein, program code executing on one or more processors analyzes aspects of a query (e.g., SQL statement, access path, and runtime structure). The program code also analyzes database distribution and replication architecture of a database in which the query will be executed, which can include shard mapping and replication mapping. Sharding distributes a single dataset across multiple databases, which can then be stored on multiple machines, to enable larger datasets to be split into smaller chunks and stored in multiple data nodes, increasing the total storage capacity of the system. The program code can analyze LOB usage within the database. Based on these analyses, in some examples, the program code can create temporary implicit columns for LOB references. The program code can then build a runtime structure to include the implicit columns. In some examples, the database is maintained in a cloud computing environment or another distributed and/or computing architecture. In these examples, the program code can maintain implicit columns between shards. The program code can define implicit columns for multiple database nodes and build these columns for a selected shard. The program code can select one of the shards for each LOB which is accessed frequently. For shards with hot access frequencies, the program code can build or move the implicit columns and can maintain multiple copies on the same shard.

Embodiments of the present invention are inextricably tied to computing. The examples herein provide a computer-based solution to an issue in computing. Many applications and products rely on executing queries in databases. How these queries pull data from various databases within computing systems, such as distributed systems, can be managed by middleware, including database management software. As computing systems grow and enterprise, hybrid, and cloud or other distributed computing environments become more prevalent, inefficient queries can stress the system as a whole and can compromise the performance of the system. As discussed above, LOBs enable storage of data in a database and in operating system files accessed from the database. However, utilizing LOBs can introduce performance challenges: 1) involving LOB columns in sort statements can consume work file storage and decrease sort performance; and 2) when LOBs are referenced multiple times in a query, current query execution approaches decrease query performance because they retrieve the LOB table space each time when evaluating a LOB column. The examples herein are inextricably tied to computing because they address this issue, which is a computing issue, using an approach that manages the processing of these queries, which are also inextricably tied to computing.

The examples herein are directed to a practical application and provide significantly more than existing approaches to executing queries that call LOB columns. LOB columns are columns that contain large amounts of data either in Binary Format (BLOBs) or Character Format (CLOBs). Tables with LOB data can be processed like other data types, and LOB data can be edited and browsed like other data. The examples herein are directed to a practical application at least because the examples herein address a particular issue: the advantages of storing data in LOBs can be outweighed in database systems by the negative impacts referencing these LOBs in a query can have on the query performance. The computer-implemented methods, computer program products, and computer systems described herein provide an approach to generating an implicit column structure to store LOBs and to enable queries to access this implicit structure rather than LOB columns (e.g., LOB table space), to improve query performance. The examples herein provide significantly more than existing approaches at least because there are various advantages to implementing aspects of these examples. For example, utilizing aspects of the examples herein significantly reduces getPages and CPU usage, significantly improves select efficiency for LOBs, and is transparent to customers and can be implemented without making any changes to the applications (used by the customers; the applications generate the queries). Embodiments of the present invention provide computer-implemented methods, computer program products, and computer systems which, when implemented, improve the performance of queries involving LOBs in a manner that was not previously disclosed. As described herein, program code in examples herein generates implicit columns to store LOBS columns involved in sorts and in functions. This approach decreases sort storage and new SELECT statements with related LOB calls will return results from the implicit columns directly. Unlike some other approaches to handling LOBs in queries, the implicit columns generated by the program code in the examples herein can also be utilized in NoSQL databases (also referred to as "not only SQL", "non-SQL", an approach to database design that enables the storage and querying of data outside the traditional structures found in relational databases) to promote query efficiency. The examples herein also provide significant advantages over existing approaches because certain of the examples utilize machine learning to train and implement a classifier to determine whether to use implicit columns in certain circumstances. As explained herein, program code comprising machine learning algorithms obtains inputs, including but not limited to LOB size, inline length usage, sort or internal function usage, and/or frequency for query usage, calculates query normalization, and determines whether to generate implicit columns.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code involved in performing the inventive methods, such as a code block for planning and executing queries in one or more databases 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allow the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation and/or review to an end user, this recommendation would typically be communicated from network module 115 of computer 101 through WAN 102 to EUD 103. In this way, EUD 103 can display, or otherwise present, the recommendation and/or review to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation and/or review based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
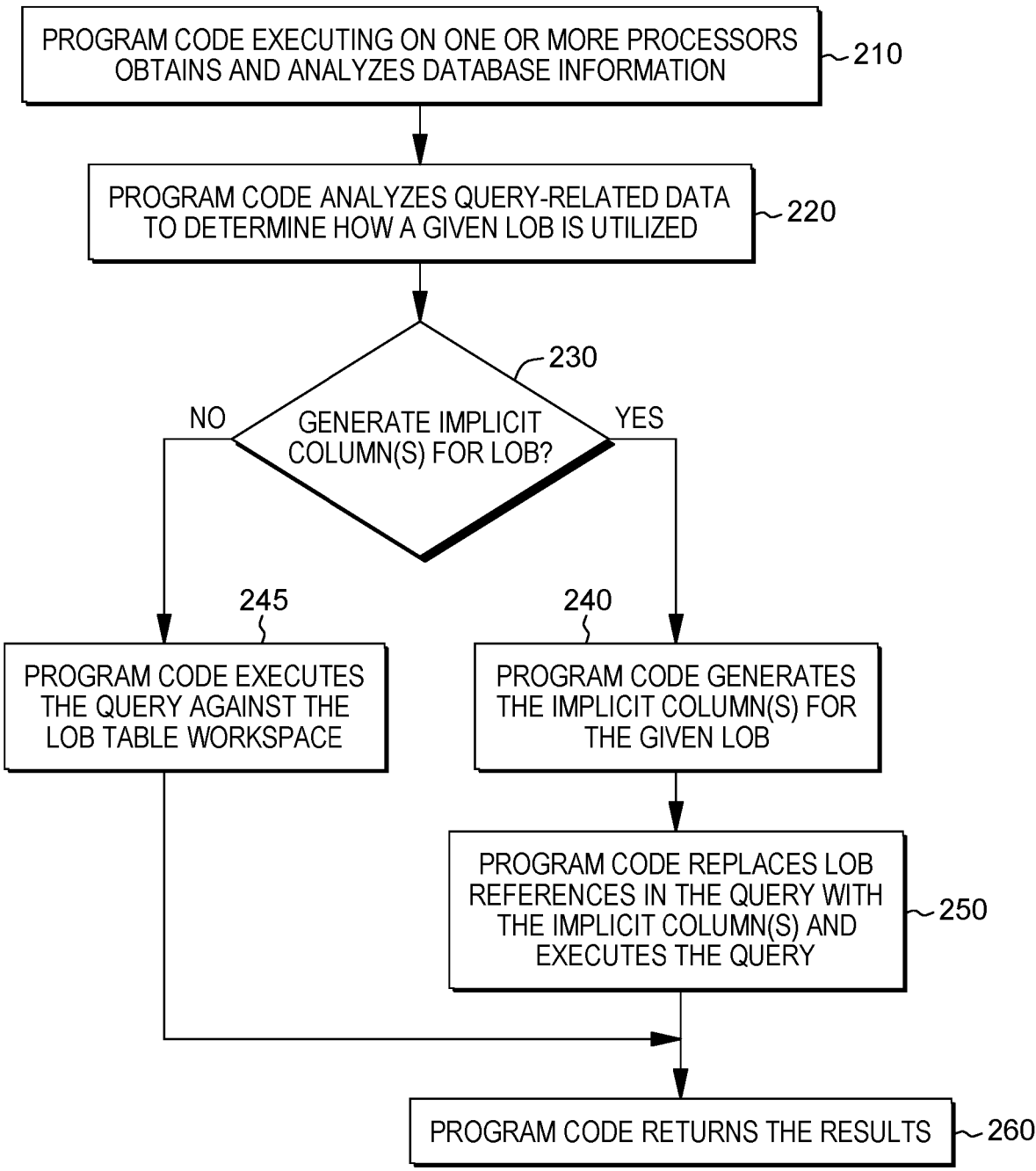
FIG. 2 is a workflow of various aspects performed by the program code (executing on one or more processors) in some embodiments of the present disclosure.
Figure 3:
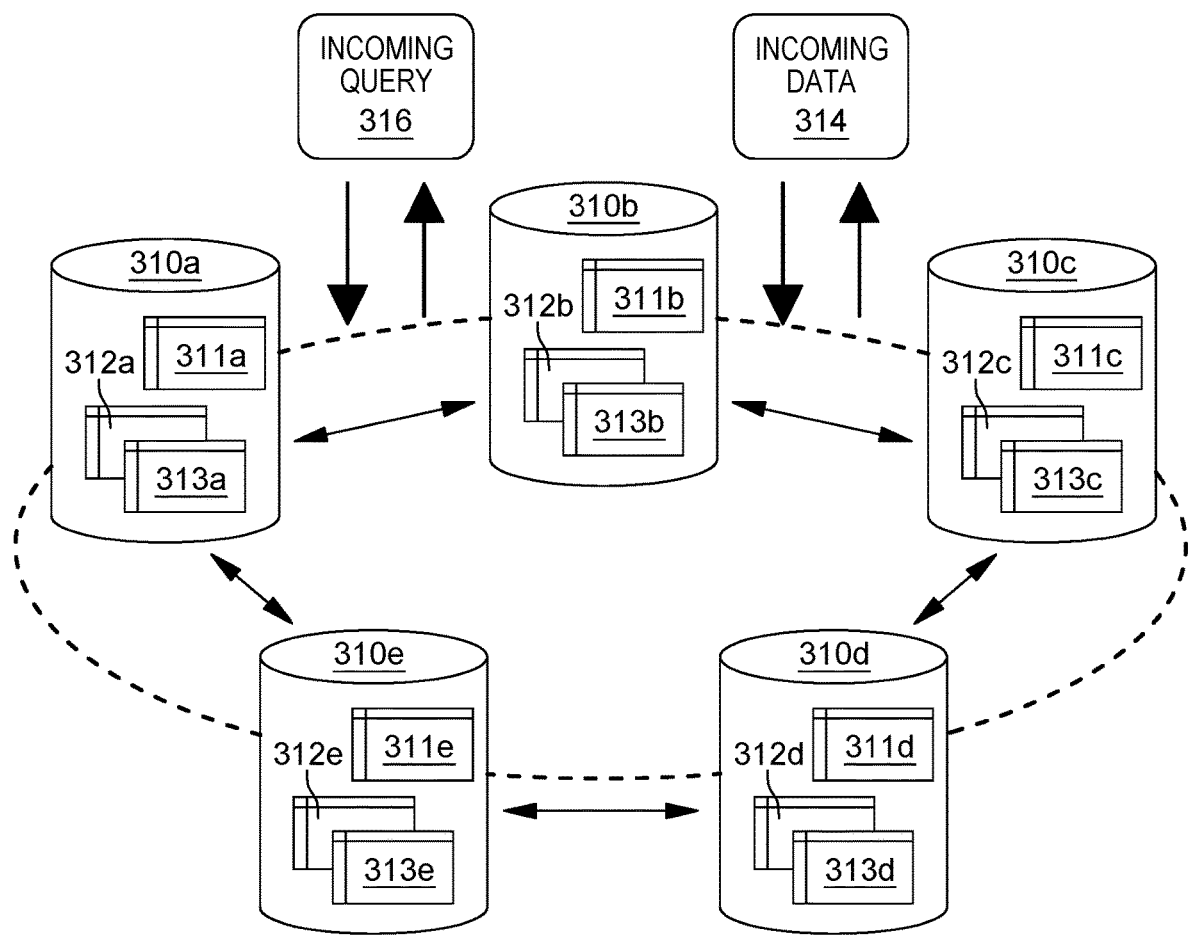
FIG. 3 illustrates the implementation of various aspects of the examples herein in a database system where sharding is utilized.

In the examples, herein, for each LOB referenced in queries in a database system, the program code determines whether returning results for the query means enabling the query to access the LOB in the original database location, or, alternatively, redirecting the access to an implicit column. FIG. 2 is a workflow 200 that illustrates various aspects of some examples herein. As illustrated in FIG. 2, program code executing on one or more processors obtains and analyzes database information (210). For example, the program code can analyze database distribution and replication architecture, including shard mapping and replication mapping. Sharding separates large databases into smaller, more easily managed parts called database shards that can be spread across multiple database servers. As will be discussed herein, various examples herein can be implemented in distributed environments that utilize sharding in their architectures. FIG. 3 illustrates an implementation of implicit columns, an aspect of the examples herein, in a computing system that includes sharding of a database.

FIG. 3 illustrates part of a database 300 of a computing system where the database is distributed into shards 310a-310e (this number was chosen arbitrarily and not to suggest any limitations). Sharding is utilized in various enterprise and distributed computing environments including in cloud computing environments. The larger arrows represent an incoming query 316 and incoming data 314 (the data are distributed over the shards 310a-310e). Program code, executing on one or more processors, maintains implicit columns 311a-311e, 312a-312e, 313a-313e across the shards 310a-310e. In certain examples implemented in computing environments that include shards, as illustrated in FIG. 3, the program code can maintain implicit columns between shards. Program code can define implicit columns for multiple database nodes and build these implicit columns for selected shards. When the program code redirects a query to reference an implicit column instead of a database table (e.g., data file or table workspace) for a LOB, in an environment such as that pictured in FIG. 3, the program code can select one of the shards for each copy which is accessed frequently. For shards with hot access frequencies, the program code can maintain multiple copies of an implicit column for a given LOB on the same shard. For examples, the program code can generate multiple copies or can move copies from other shards to a single shard because of the frequency of the accesses.

Returning to FIG. 2, the program code obtains database information (210) that includes both statistics and activities. The program code can collect and analyze various statistics related to various database objects of various granularity. For example, for a table, the program code can obtain the object's cardinality (e.g. the number of unique values in a relational table column relative to the total number of rows in the table). For a single column, the program code can obtain (and analyze) statistics, including, but not limited to, cardinality, low2key (second lowest value), high2key (second highest value), and/or frequency (common values, frequency of values, etc.). Histogram statistics enable program code of the database to improve access path selection by estimating predicate selectivity from value-distribution statistics that are collected over the entire range of values in a data set. Hence, histogram statistics summarize data distribution on an interval scale by dividing the entire range of possible values within a data set into a number of intervals. Thus, in some examples, the program code can obtain statistics related to a portion of a column, a histogram, which can include, for that histogram (or quantile), cardinality, low2key, high2key, and/or frequency. In some examples, the program code can obtain statistics for multiple columns, including the single column statistics, multiple cardinalities, and multiple column frequencies. In some examples, the program code also obtains statistics for partitioned tables. These partitioned tables can be utilized in various databases to separate data into logical units, which can be stored in more than one file group and data sets of rows can be mapped to individual partitions. A partitioned table or index is a single object and resides in a single schema within a single database. For each partitioned table, the program code can obtain single column statistics, and for each partition (e.g., partition key), cardinality, low2key, high2key, and/or frequency.

As aforementioned, the program code can obtain activities as part of the database information. For example, the program code can monitor activities in various parts of a database system including, but not limited to, sorts, joins, rscans, iscans, fetches, findkeys, and/or fixpg activities. The program code can monitor these activities in different parts of the database, including but not limited to, in a shared memory (including a shared memory of a distributed infrastructure database), an in-memory database, a database management system, a cloud infrastructure database, and/or a relational database service.

Returning to FIG. 2, once the program code has obtained database statistics and activities, the program code can determine how a given LOB fits into the system. Thus, the program code analyzes query-related data to determine how a given LOB is utilized (220). To determine how a LOB is utilized in a database environment (which can include a cloud or other shared or distributed computing environment), the program code can analyze aspects including but not limited to SQL statements referencing the LOB (currently and/or historically), access path, and runtime structure. When analyzing an access path, the program code can follow this access path and identify, for a LOB, if sorts involve a LOB column. The program code can also analyze SQL statements and runtime to determine if a function that includes the LOB column references it multiple times. In some examples, the program code can obtain database statistics and database activities to get related data distribution and fields usage trends. The program code can utilize an optimizer to navigate the aforementioned access path, so that the program code can identify if sorts in the path involve a LOB column. The program code can also collect hot spots for the data and based on these hot spots, identify if a function containing a LOB is referenced multiple times. The program code can generate time series predictions for potential activities involving each LOB, including but not limited to insert, delete, reorg (creating a temporary copy of a table), and split.

Figure 4:
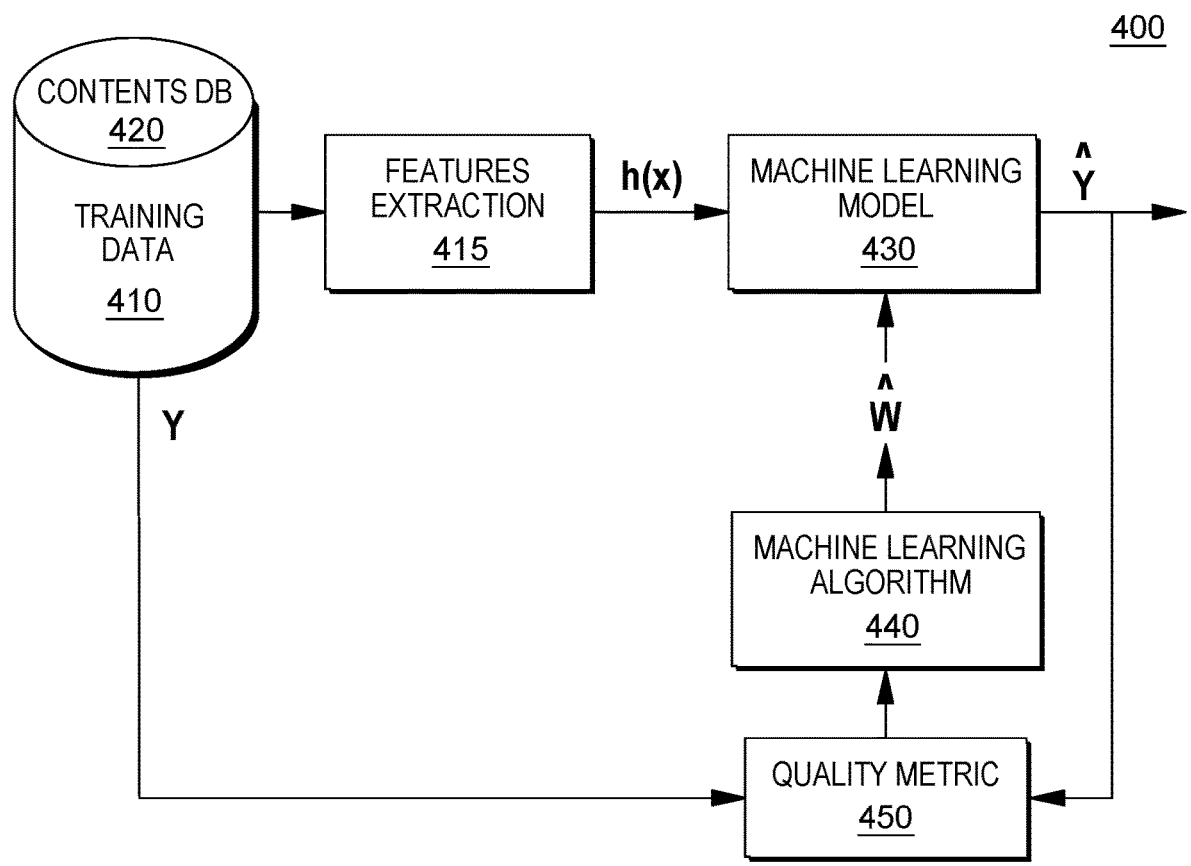
FIG. 4 is an example of a machine learning training system that can be utilized to perform cognitive analyses of queries comprising LOBs to determine whether to access the LOBs in the table workspace or via implicit columns.

The program code determines, based on the analysis, whether to create implicit columns rather than pulling a LOB from the data file (230). In making this determination, the program code determines which kinds of behavior indicate that the program code should generate and/or utilize an implicit column when a given LOB is called. To perform this analysis, the program code can convert query statements to a normalization query pattern. The program code can utilize a classifier (e.g., machine learning algorithm(s)) to determine whether a given LOB should be replaced (in a query call) with a reference to an implicit column and whether the program code should generate the implicit column. FIG. 4 illustrates a classifier that can be utilized to determine whether a given LOB should be accessed via a data file (e.g., directly in the database) or whether the program code should reference an implicit column.

A classifier, which is illustrated in FIG. 4, can be comprised of various cognitive algorithms, AI instruction sets, and/or machine learning algorithms. Classifiers can include, but are not limited to, deep learning models (e.g., neural networks having many layers) and random forests models. Classifiers classify items (data, metadata, objects, etc.) into groups, based on relationships between data elements in the metadata from the records. In some embodiments of the present invention, the program code obtains as input parameters related to a given LOB: query normalization, LOB size, inline length usage, sort, or internal function usage, and/or frequency for query usage, and the classifier can output whether to generate or utilize implicit columns. In some embodiments, the program code can output a structure for an implicit column for a given LOB. In general, program code utilizes a classifier to create a boundary between data of a first quality data of a second quality, in the context of the examples herein, LOBs which can be accessed directly when queries are executed and LOBs which should be replaced with implicit columns. As a classifier is continuously utilized, its accuracy can increase as testing the classifier tunes its accuracy. When training a classifier, in some examples, program code feeds a pre-existing feature set describing features of metadata and/or data into the one or more cognitive analysis algorithms that are being trained. The program code trains the classifier to classify records based on the presence or absence of a given condition, which is known before the tuning. The presence or absence of the condition is not noted explicitly in the records of the data set. When classifying a source as providing data of a given condition (based on the metadata), utilizing the classifier, the program code can indicate a probability of a given condition with a rating on a scale, for example, between 0 and 1, where 1 would indicate a definitive presence. The classifications need not be binary and can also be values in an established scale.

A deep learning model can refer to a type of classifier. A deep learning model can be implemented in various forms such as by a neural network (e.g., a convolutional neural network). In some examples, a deep learning mode includes multiple layers, each layer comprising multiple processing nodes. In some examples, the layers process in sequence, with nodes of layers closer to the model input layer processing before nodes of layers closer to the model output. Thus, layers feed to the next. Interior nodes are often "hidden" in the sense that their input and output values are not visible outside the model.

Neural networks refer to a biologically inspired programming paradigm which enables a computer to learn from observational data. This learning is referred to as deep learning, which is a set of techniques for learning in neural networks. Neural networks, including modular neural networks, are capable of pattern recognition with speed, accuracy, and efficiency, in situations where data sets are multiple and expansive, including across a distributed network of the technical environment. Modern neural networks are non-linear statistical data modeling tools. They are usually used to model complex relationships between inputs and outputs or to identify patterns in data (i.e., neural networks are non-linear statistical data modeling or decision-making tools). In general, program code utilizing neural networks can model complex relationships between inputs and outputs and identify patterns in data. Because of the speed and efficiency of neural networks, especially when parsing multiple complex data sets, neural networks and deep learning provide solutions to many problems in image recognition, speech recognition, and natural language processing. Neural networks can model complex relationships between inputs and outputs to identify patterns in data, including in images, for classification.

A convolutional neural network (CNN) is a class of neural network. CNNs utilize feed-forward artificial neural networks and are most commonly applied to analyzing visual imagery. CNNs are so named because they utilize convolutional layers that apply a convolution operation (a mathematical operation on two functions to produce a third function that expresses how the shape of one is modified by the other) to the input, passing the result to the next layer. The convolution emulates the response of an individual neuron to visual stimuli. Each convolutional neuron processes data only for its receptive field. It is generally not practical to utilize general (i.e., fully connected feedforward) neural networks to process data rich objects, such as images, as very high number of neurons would be necessary, due to the very large input sizes associated with larger filed. Utilizing a CNN addresses this issue as it reduces the number of free parameters, allowing the network to be deeper with fewer parameters, as regardless of image size, the CNN can utilize a consistent number of learnable parameters because CNNs fine-tune large amounts of parameters and massive pre-labeled datasets to support a learning process CNNs resolve the vanishing or exploding gradients problem in training traditional multi-layer neural networks, with many layers, by using backpropagation. Thus, CNNs can be utilized in large-scale recognition systems, giving state-of-the-art results in segmentation, object detection and object retrieval.

FIG. 4 illustrates an example of a classifier that can be generated by the program code and utilized in the examples herein to classify a LOB for replacement (in query calls) with an implicit column or not. The program code converts query statements to normalization query patterns and determines, based on parameters, including but not limited to query normalization, LOB size, inline length usage, sort or internal function usage, and frequency for query usage, whether patterns in these inputs indicate that referencing a LOB directly would compromise performance of the computing system, or, alternatively, if replacing a direct call with an implicit column would improve performance of the system. FIG. 4 is one example of a machine teaming model with a classifier 400 that may be utilized, in one or more aspects, to generate and train resource models that can determine, based on the binary output provided by the machine learning models, that an implicit column should be referenced for a given LOB (e.g., based on a predicted probability that the LOB call will or will not adversely impact system performance).

In this example, the program code can be trained to classify LOBs, when called by queries, as either having a given probability of impacting performance (e.g., impacting performance benchmarks) or not having this probability. FIG. 4 is one example of a machine learning model with a classifier 400 that may be utilized, in one or more aspects, to perform cognitive analyses of various inputs, including the outputs of the machine learning models and/or the data utilized by these models (in some examples), which can include, but is not limited to, query normalization, LOB size, inline length usage, sort or internal function usage, and frequency for query usage (collectively referred to as the inputs). The program code in embodiments of the present invention performs a cognitive analysis to generate one or more training data structures, including the aforementioned machine learning models, which can include algorithms utilized by the program code to analyze the request, based on the inputs. Machine learning (ML) solves problems that are not solved with numerical means alone. The program code can extract various attributes from the inputs and can utilize these attributes 415 (extracted by ML models) to develop a predictor or classifier function, $h(x)$, also referred to as a hypothesis, which the program code utilizes as a machine learning model 430. In some embodiments, the input to the classifier is the binary output from each of the machine learning models.

In identifying various features and/or parameters indicative of whether a given LOB has a threshold probability of adversely impacting system performance in the ML training data 410 (in a contents database 420), the program code can utilize various techniques to identify attributes in an embodiment of the present invention. Embodiments of the present invention utilize varying techniques to select attributes (elements, patterns, features, components, etc.), including, but not limited to, diffusion mapping, principal component analysis, recursive feature elimination (a brute force approach to selecting attributes), and/or a Random Forest, to select the attributes related to various LOBs. The program code may utilize a machine learning algorithm 440 to train the machine learning model 430 (e.g., the algorithms utilized by the program code), including providing weights for the conclusions, so that the program code can train the predictor functions that comprise the machine learning model 430. The conclusions may be evaluated by a quality metric 450. By selecting a diverse set of ML training data 410, the program code trains the machine learning model 430 to identify and weight various attributes (e.g., features, patterns, components) that correlate to LOBs and whether calls to these LOBs in queries impacted system performance (to a degree of concern that can be pre-defined).

The model generated by the program code can be self-learning as the program code updates the model based on active feedback, as well as from the feedback received from data related to query performance of queries that call LOBs. For example, when the program code determines that there is information that was not previously predicted or classified by the model, the program code utilizes a learning agent to update the model to improve classifications in the future. Additionally, when the program code determines that a classification is incorrect, either based on receiving user feedback through an interface or based on monitoring query performance in the system, the program code updates the model to reflect the inaccuracy of the classification (e.g., for the given period of time). Program code comprising a learning agent can cognitively analyze the data deviating from the modeled expectations and can adjust the model to increase the accuracy of the model, moving forward. For some situations, LOB usage via implicit columns may not benefit system performance without modifying inline length size to save space. Thus, the program code can (e.g., automatically) modify inline length to meet real-time usage requirements, in these circumstances.

Figure 5:
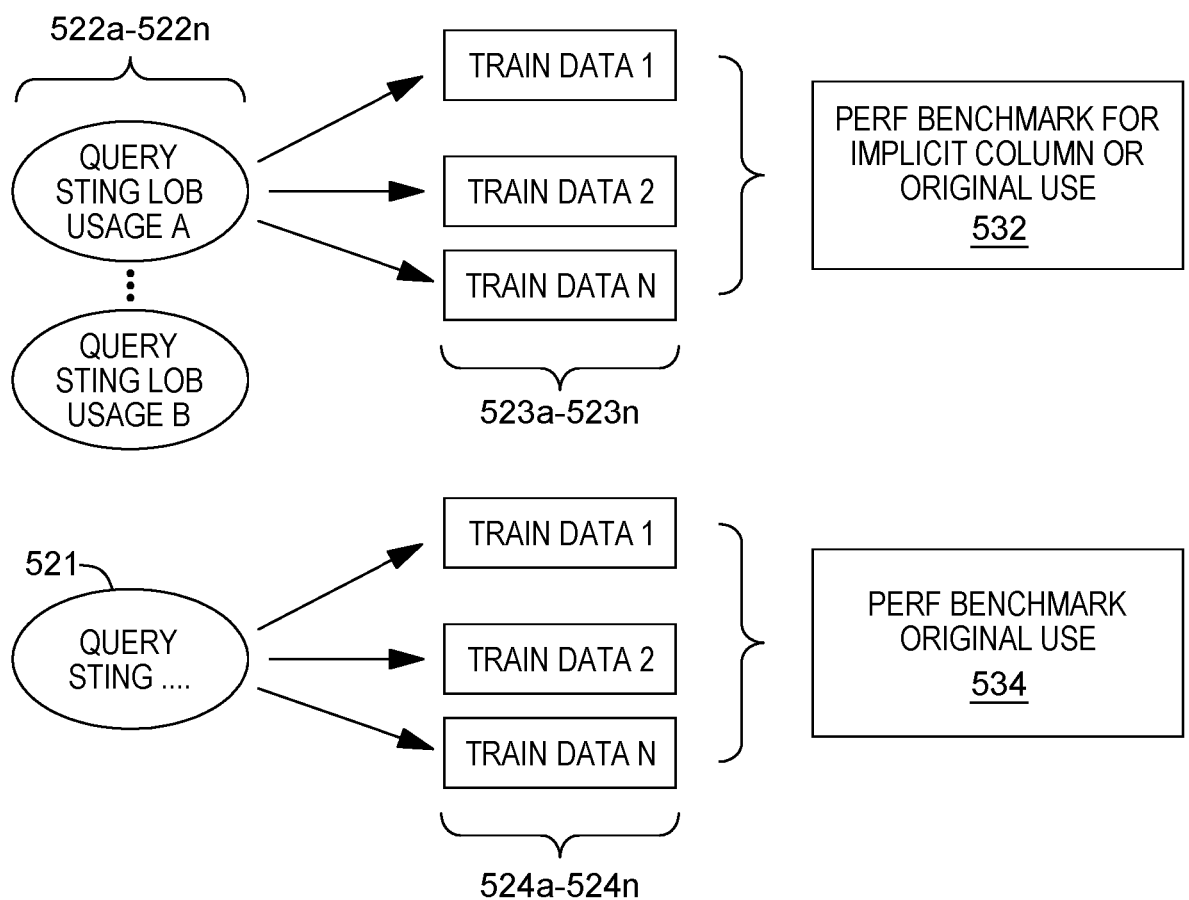
FIG. 5 illustrates how program code in embodiments in the present disclosure can utilize machine learning to build an implicit column usage knowledge base by analyzing LOB query performance.

FIG. 5 illustrates how program code in embodiments of the present invention can utilize machine learning to build an implicit column usage knowledge base by analyzing LOB query performance. Because the program code of the classifier (e.g., FIG. 4, 400) determines whether a query that references a LOB (e.g., column) should access an implicit column or pull data from the LOB (e.g., column), as stored in the database, the program code can train the classifier with an implicit column usage knowledge base to establish a performance benchmark for revising a query to utilize implicit columns and/or to establish a performance benchmark for a query to utilize the LOB in the database to return query results. As illustrated in FIG. 5, the program code iteratively performs queries (e.g., background queries) and the handling of these queries helps to build the implicit column usage knowledge base. As input, the program code (of a machine learning algorithm) obtains different sample data and outputs multiple performance benchmark results. The program code builds the implicit column usage base based on this performance testing. Based on the iterative testing, the program code determines a benchmark for either utilizing an implicit column or pulling results directly from the database, for a query referencing a given LOB. The program code utilizes the implicit column usage base to predict and apply the one or more machine learning algorithms trained to sample data, to determine whether to generate and/or reference an implicit column when a given LOB is referenced in a query.

FIG. 5 illustrates the program code extracting data to utilize as training data 523a-523n from query strings 522a-522n that include references to a LOB (e.g., different usages, FIG. 5 illustrates a usage A and a usage B). The program code (having applied a machine learning algorithm or program code of a machine learning algorithm) outputs performance benchmarks for implicit columns and for the original query execution path 532. The program code can also train the classifier (e.g., FIG. 4, 400) by obtaining query strings that do not include LOBs 521 and extract training data 524a-524n from these query strings to output performance benchmarks for the original query execution path 534. Utilizing these training data 523a-523n, 524a-524n, the program code generates an implicit column usage knowledge base and enables the program code to establish benchmarks (e.g., thresholds) for use by the classifier (e.g. FIG. 4, 400).

Returning to FIG. 2, the program code determines (e.g., utilizing a trained classifier) whether to generate implicit columns for the given LOB (230). The program code can also check whether a data structure already exists in the database with implicit columns that include the LOB that is presently being executed by the program code and can determine at this stage whether to utilize the existing implicit columns. The program code can determine whether, based on pre-defined factors, including by referencing the implicit column usage database, if a LOB in the query is related to a LOB which the program code utilized to generate implicit columns. Thus, the program code determines whether to generate and reference and/or just reference implicit columns to generate results for a given query. If the program code determines that the results can be pulled from the LOB table workspace, the program code executes the query against this space (245) and returns results (260). If the program code determines that the query should be executed against implicit columns rather than the LOB table workspace, the program code generates the implicit column(s) for the given LOB (240). The program code replaces LOB references in the query with the implicit column(s) and executes the query (250). The program code then returns the results (260).

Figure 6:
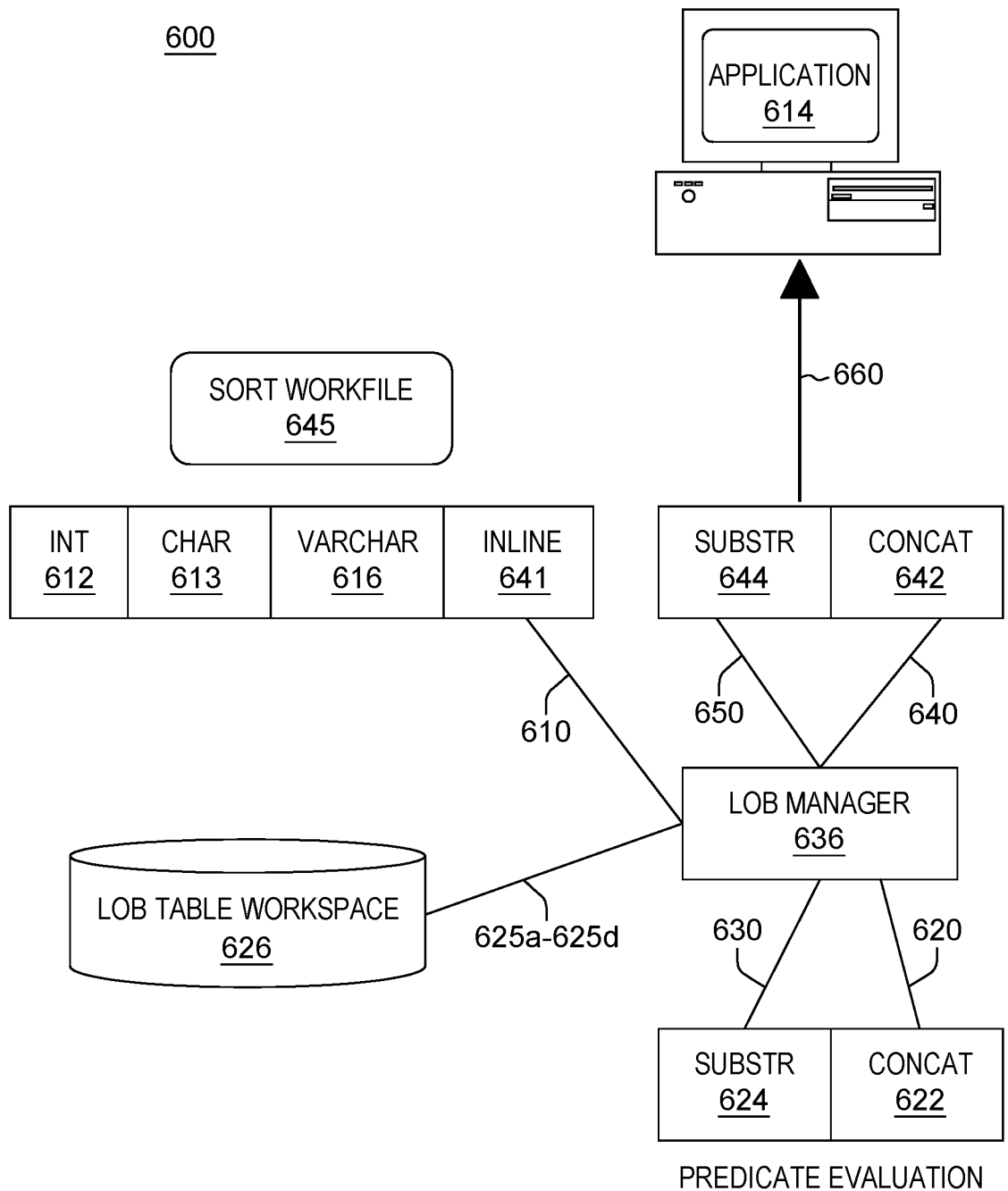
FIG. 6 is an overview of the execution of a query that includes a LOB when aspects of the disclosure are not implemented in a database system.
Figure 7:
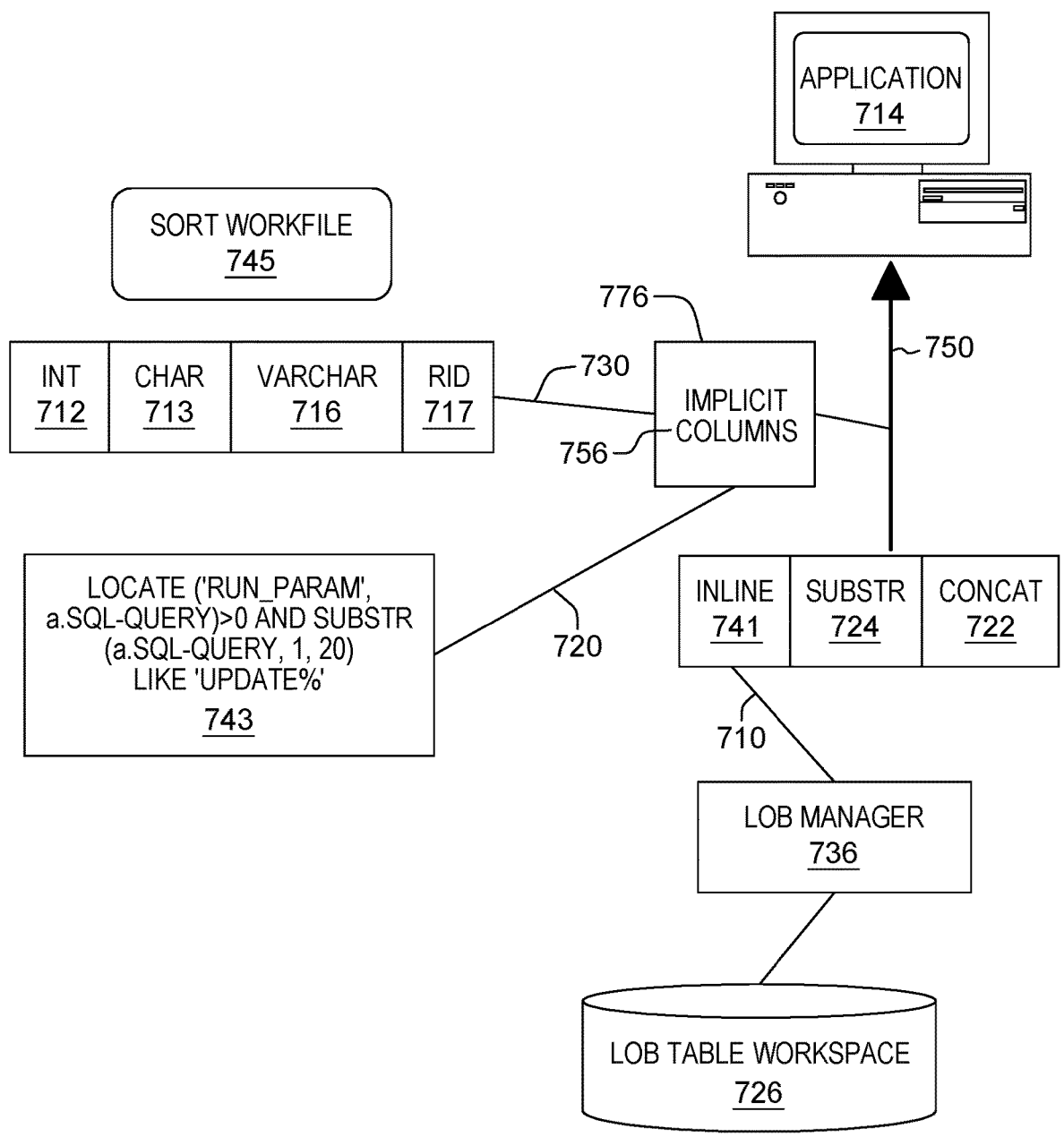
FIG. 7 is an overview of the execution of a query that includes a LOB when aspects of the disclosure are implemented the database system.

FIGS. 6-7 illustrate how utilizing aspects of some examples herein can improve the performance of a query that references a LOB. FIG. 6 illustrates an original path for executing a given query, without implementing aspects of the examples herein. Meanwhile, FIG. 7 illustrates how program code in certain of the examples herein executes the same query, with improved performance. Below is the given query (provided for illustrative purposes only and not to suggest any limitations).

```
SELECT b.CNTRL_ID, b.USER_ID,
LOCATE('RUN_PARM', a.SQL_QUERY) , SUBSTR(a.SQL_QUERY, 1, 20)
FROM a36.tg10m103 a INNER JOIN a36.tg10m023 b
ON a.CNTRL_ID = b.CNTRL_ID
WHERE LOCATE('RUN_PARM', a.SQL_QUERY) > 0 and
SUBSTR(a.SQL_QUERY, 1, 20) LIKE 'UPDATE%' ;
```

The query obtains four values, field CNTRL_ID, USER_ID (both from table b), a string called RUN_PARAM, and a string of characters in positions 1-20 (both from the LOB SQL). The query selected (e.g., using a SELECT statement) fields CNTRL_ID and USER_ID from table b. The query then locates, using the LOCATE command, (e.g., searches for a string within another string) a value called 'RUN_PARAM' in LOB SQL_QUERY and extracts, using the SUBSTR command, some characters 1-20 from the LOB SQL_QUERY from a data set comprised of a joined (e.g., INNER JOIN, a selection of keywords with matching values a36.tg10m103 and a36.tg10m023 in tables a and b), where the JOIN is where the CNTRL_ID is the same in each table (e.g., ON the clause specifies the JOIN conditions). Additionally, the values are only selected where the 'RUN_PARAM' string in the LOB SQL_QUERY in greater than 0 (based on using the LOCATE command) and where the values 1-20 in the string from the LOB SQL_QUERY matched "UPDATE%"—meaning that is starts with "UPDATE" but can have anything else after that (based on using the SUBSTR command).

FIG. 6 illustrates an original path to executing this query. When the query above is executed without using the implicit column functionality described herein, the program code executes the query in a manner in which SQL_QUERY, a LOB column in the query, is written into a sort workfile and referenced multiple times. The multiple references can adversely affect the performance of the system. First, the sort workfile includes an inline portion of the LOB. Additionally, to execute the query, the program code retrieves LOB data to evaluate a predicate with LOCATE('RUN_PARM', a.SQL_QUERY) and SUBSTR(a.SQL_QUERY, 1, 20). Finally, the program code also retrieves LOB data for LOCATE('RUN_PARM', a.SQL_QUERY) and SUBSTR (a.SQL_QUERY, 1, 20) to bind out to an application. Thus, FIG. 6 illustrates an application 614 to which query results are returned by the program code (e.g., the program code can bind results out to an application 614, a manner of transmitting data to the application). The application 614 (because the program code executes the query from the application 614) obtains results from the query from the LOB table space 626. Program code executing on one or more processors calls a LOB manager 636 to access the LOB table space 626.

The program code executes the query following an original path 600 (not utilizing aspects of the examples herein) in FIG. 6. The program code executing the query writes the inline 641 portion of the query into a sort workfile 645 for sorting (610). An inline query is a type of sub-query present in a FROM clause of a SQL query as a data source. Thus, when writing the inline portion (610), the program code pulls various data types from the LOB table workspace 626, including INT (integer, e.g., a numerical value with a defined range) 612, CHAR (character, e.g., a fixed length with a maximum length (e.g., 8,000 characters)) 613, VARCHAR (variable length character, e.g., variable-length storage with a maximum length (e.g., 8,000 characters)) 616. As illustrated, the program code executing the query calls the LOB manager 636 a total of four times (because of the number of references in the query). Each time, the LOB manager accesses the LOB table workspace 626 (625a-625d). The program code calls the LOB manager 636 twice when evaluating predicates in the SQL query. First, the program code calls the LOB manager 636 to evaluate the predicate LOCATE('RUN_PARM', a.SQL_QUERY)>0 622 (620). Second, the program code also calls the LOB manager 636 to evaluate the predicate SUBSTR (a.SQL_QUERY, 1, 20) LIKE 'UPDATE%' 624 (630). When the program code binds out to the application 614 (transmits data to the application) (660), the program code calls the LOB manager 636 two more times. The program code calls the LOB manager 636 to evaluate the function LOCATE('RUN_PARM', a.SQL_QUERY) 642 (640) and to evaluate the function SUBSTR(a.SQL_QUERY, 1, 20) 644 (650).

FIG. 7 illustrates the execution of the query 700 utilizing aspects of the examples herein. In contrast to the example in FIG. 6, where the program code calls the LOB manager 636 four times (e.g., 610, 620, 640, 650), in FIG. 7, program code executing on one or more processors calls the LOB manager 736 once, to evaluate predicates on the LOB column (e.g., LOCATE('RUN_PARM', a.SQL_QUERY)>0 722 and SUBSTR(a.SQL_QUERY, 1, 20) LIKE 'UPDATE%' 724)). Because a predicate can have a Boolean value that is responsive to the query, the program code can determine that this type of query can be executed against the LOB table workspace 726 without compromising the performance of the database. Responsive to this call, the LOB manager 736, upon accessing the LOB table workspace 726, outputs a qualified record. The program code generates implicit columns 756 for LOCATE('RUN_PARM', a.SQL_QUERY) and SUBSTR(a.SQL_QUERY, 1, 20) 743 (which can be based on part of the predicate result) (720). The program code generates a runtime structure 776 to include these implicit columns 756 (730). The implicit columns 756 can include various data types from the LOB table workspace 726, including INT 612, CHAR 713, VARCHAR 716, and a record identifier (RID) 717. In this example, the inline portion 741 does not participate in a sort (e.g., in the sort workfile 745). For LOB columns involved in a son, in some examples, the program code generates (e.g., temporary) implicit columns which contain the inline portion 741. For LOB columns involved in a function (e.g., LOCATE('RUN_PARM', a.SQL_QUERY) and SUBSTR (a.SQL_QUERY, 1, 20)) the program code generates implicit columns which include the results of the functions.

As illustrated in FIG. 7, the program code calls the LOB manager 736 to evaluate the predicates LOCATE('RUN_PARM', a.SQL_QUERY)>0 722 and SUBSTR (a.SQL_QUERY, 1, 20) LIKE 'UPDATE%' 724 (710). As aforementioned, the program code generates implicit columns 756 for a.SQL_QUERY, LOCATE('RUN_PARM' a.SQL_QUERY) and SUBSTR(a.SQL_QUERY, 1, 20) and builds a runtime structure 776 to house the implicit columns 756 (720). These implicit columns can contain the results of these functions. The program code evaluates the functions LOCATE('RUN_PARM', a.SQL_QUERY) and SUBSTR (a.SQL_QUERY, 1, 20) by accessing the implicit columns (740). The program code returns results to the application 714 (750).

The program code generates a runtime structure 776 to include these implicit columns 756. The same functions with the same LOB columns, in some examples, share one results buffer of the implicit columns 776. Going forward, when the program code obtains a SELECT statement with a related LOB, the program code will return results for the SELECT statements from the implicit columns 756. As additional queries are executed by the system, the program code can continue to build the implicit column usage base, as illustrated in FIG. 5 (e.g., iterate and perform queries in the background and feed machine learning algorithms with different sample data to get multiple performance benchmark results).

Certain examples can also be utilized in NoSQL databases. In these examples, the implicit columns can be kept for function results screening. For examples, the program code can combine different large objects into one or more new pointer objects in implicit columns.

The examples herein include computer-implemented methods, computer program products, and computer systems, where program code executed by one or more processors obtains a given query for execution in the database system, wherein the given query comprises at least one reference to the LOB. The program code obtains statistics and activities performed in the database system. The program code establishes performance benchmarks for executing queries in the database system based on analyzing the statistics and the activities to set performance. The program code analyzes the given query to determine how the LOB in the given query is utilized in the given query. The program code determines, based on at least one performance benchmark of the performance benchmarks and based on the analyzing of the given query, that meeting the at least one benchmark requires replacing the at least one reference to the LOB with a reference to one or more implicit columns. The program code executes the given query by referencing the one or more implicit columns to obtain query results for the given query. The program code returns the query results.

In some examples, the program code generates the one or more implicit columns, the one or more implicit columns comprising a portion of the LOB relevant to the given query.

In some examples, the program code analyzes the given query by determining that the LOB is involved in a sort and the portion of the LOB relevant to the given query comprises an inline portion of the given query.

In some examples, the program code analyzes the given query comprises by determining that the LOB is involved in one or more functions and the portion of the LOB relevant to the given query comprises results of the one or more functions.

In some examples, the statistics comprise statistics relevant to aspects selected from the group consisting of: tables, single columns, histograms, multiple columns, and partitioned tables.

In some examples, the statistics are selected from the group consisting of cardinality, low2key, high2key, and frequency.

In some examples, the activities are selected from the group consisting of: sorts, joins, rscans, iscans, fetches, findkeys, and fixpg activities.

In some examples, the program code obtaining the activities comprises the program code monitoring database activities in various parts of the database system, the various parts selected from the group consisting of: a shared memory, an in-memory database, a database management system, a distributed environment infrastructure database, and a relational database service.

In some examples, the program code determining that meeting the at least one benchmark requires replacing the at least one reference to the LOB with the reference to one or more implicit columns comprises applying a trained classifier for the determining.

In some examples, the program code applying the trained classifier comprises: the program code normalizing the given query, and the program code providing, as input to the classifier, at least one attribute selected from the group consisting of: the query normalization, LOB size, inline length usage, sort or internal function usage, and frequency for given query usage.

In some examples, the program code trains the classifier. The program code builds an implicit column usage knowledge base, the building by obtaining sample data comprising query strings referencing the LOB for different usages and query strings that do not reference the LOB, iteratively executing the query strings as a background processes, outputting, based on the iteratively executing, query string results comprising the performance benchmarks, and retaining the query string results in the implicit column usage knowledge base. The program code applies at least one machine learning algorithm to the implicit column usage knowledge base to train the classier, wherein based on the machine learning, the classier is the trained classifier.

In some examples, the performance benchmarks comprise performance benchmarks relevant to utilizing the one or more implicit columns to return the query results and relevant to pulling the query results from a table workspace of the LOB.

In some examples, the program code executing the given query comprises: the program code extracting, from the query, one or more predicates and one or more functions, wherein the one or more predicates and the one or more functions reference the LOB, the program code obtaining a result for the one or more predicates from a LOB table workspace. The program code obtaining the results can include the program code calling a LOB manager to evaluate the one or more predicates utilizing the LOB table workspace, and the program code obtaining, as output from the LOB manager, a qualified record, wherein the qualified record comprises the result for the one or more predicates. The program code can generate, based on the one or more functions, the one or more implicit columns. The program code can evaluate the one or more functions based on accessing the one or more implicit columns.

In some examples, the program code generates a runtime structure comprising the one or more implicit columns.

In some examples, the database system comprises shards. In these examples, the program code maintains the runtime structure between the shards.

Although various embodiments are described above, these are only examples. For example, reference architectures of many disciplines may be considered, as well as other knowledge-based types of code repositories, etc., may be considered. Many variations are possible.

Various aspects and embodiments are described herein. Further, many variations are possible without departing from a spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of planning and executing a query referencing a large object (LOB) in a database system, the method comprising:

training, by one or more processors, a classifier, the training comprising:

building, by the one or more processors, an implicit column usage knowledge base, the building comprising:

obtaining, by the one or more processors, sample data comprising query strings referencing the LOB for different usages and query strings that do not reference the LOB;

iteratively executing, by the one or more processors, the query strings as a background processes;

outputting, by the one or more processors, based on the iteratively executing, query string results comprising the performance benchmarks; and retaining, by the one or more processors, the query string results in the implicit column usage knowledge base; and applying, by the one or more processors, at least one machine learning algorithm to the implicit column usage knowledge base to train the classifier, wherein based on the machine learning, the classifier is the trained classifier;

obtaining, by the one or more processors, a given query for execution in the database system, wherein the given query comprises at least one reference to the LOB;

obtaining, by the one or more processors, statistics and activities performed in the database system;

establishing, by the one or more processors, performance benchmarks for executing queries in the database system based on analyzing the statistics and the activities to set performance;

analyzing, by the one or more processors, the given query to determine how the LOB in the given query is utilized in the given query;

determining, by the one or more processors, based on at least one performance benchmark of the performance benchmarks and based on the analyzing of the given query, that meeting the at least one performance benchmark requires replacing the at least one reference to the LOB with a reference to one or more implicit columns, wherein the determining that meeting the at least one performance benchmark requires replacing the at least one reference to the LOB with the reference to one or more implicit columns comprises applying the trained classifier for the determining;

executing, by the one or more processors, the given query, wherein the executing comprises the given query referencing the one or more implicit columns to obtain query results for the given query; and returning, by the one or more processors, the query results.

2. The computer-implemented method of claim 1, further comprising:
generating, by the one or more processors, the one or more implicit columns, the one or more implicit columns comprising a portion of the LOB relevant to the given query.

3. The computer-implemented method of claim 2, wherein the analyzing the given query comprising determining that the LOB is involved in a sort and the portion of the LOB relevant to the given query comprises an inline portion of the given query.

4. The computer-implemented method of claim 2, wherein the analyzing the given query comprises determining that the LOB is involved in one or more functions and the portion of the LOB relevant to the given query comprises results of the one or more functions.

5. The computer-implemented method of claim 2, wherein executing the given query comprises:
extracting, by the one or more processors, from the query, one or more predicates and one or more functions, wherein the one or more predicates and the one or more functions reference the LOB;
obtaining, by the one or more processors, a result for the one or more predicates from a LOB table workspace, the obtaining comprising:
calling, by the one or more processors, a LOB manager to evaluate the one or more predicates utilizing the LOB table workspace; and
obtaining, by the one or more processors, as output from the LOB manager, a qualified record, wherein the qualified record comprises the result for the one or more predicates;

generating, by the one or more processors, based on the one or more functions, the one or more implicit columns; and
evaluating, by the one or more processors, the one or more functions based on accessing the one or more implicit columns.

6. The computer-implemented method of claim 5, further comprising:
generating, by the one or more processors, a runtime structure comprising the one or more implicit columns.

7. The computer-implemented method of claim 6, wherein the database system comprises shards, the method further comprising:
maintaining, by the one or more processors, the runtime structure between the shards.

8. The computer-implemented method of claim 1, wherein the statistics comprise statistics relevant to aspects selected from the group consisting of: tables, single columns, histograms, multiple columns, and partitioned tables.

9. The computer-implemented method of claim 1, wherein the statistics are selected from the group consisting of: cardinality, low2key, high2key, and frequency.

10. The computer-implemented method of claim 1, wherein the activities are selected from the group consisting of: sorts, joins, rscans, iscans, fetches, findkeys, and fixpg activities.

11. The computer-implemented method of claim 1, wherein obtaining the activities comprises monitoring database activities in various parts of the database system, the various parts selected from the group consisting of: a shared memory, an in-memory database, a database management system, a distributed environment infrastructure database, and a relational database service.

12. The computer-implemented method of claim 1, wherein applying the trained classifier comprises:
normalizing, by the one or more processors, the given query; and
providing, by the one or more processors, as input to the classifier, at least one attribute selected from the group consisting of: the query normalization, LOB size, inline length usage, sort or internal function usage, and frequency for given query usage.

13. The computer-implemented method of claim 1, wherein the performance benchmarks comprise performance benchmarks relevant to utilizing the one or more implicit columns to return the query results and relevant to pulling the query results from a table workspace of the LOB.

14. A computer system for planning and executing a query referencing a large object (LOB) in a database system, the computer system comprising:
a memory; and
one or more processors in communication with the memory, wherein the computer system is configured to perform a method, said method comprising:
training, by the one or more processors, a classifier, the training comprising:
building, by the one or more processors, an implicit column usage knowledge base, the building comprising:
obtaining, by the one or more processors, sample data comprising query strings referencing the LOB for different usages and query strings that do not reference the LOB;
iteratively executing, by the one or more processors, the query strings as a background processes;

outputting, by the one or more processors, based on the iteratively executing, query string results comprising the performance benchmarks; and retaining, by the one or more processors, the query string results in the implicit column usage knowledge base; and applying, by the one or more processors, at least one machine learning algorithm to the implicit column usage knowledge base to train the classifier, wherein based on the machine learning, the classifier is the trained classifier;

obtaining, by the one or more processors, a given query for execution in the database system, wherein the given query comprises at least one reference to the LOB;

obtaining, by the one or more processors, statistics and activities performed in the database system;

establishing, by the one or more processors, performance benchmarks for executing queries in the database system based on analyzing the statistics and the activities to set performance;

analyzing, by the one or more processors, the given query to determine how the LOB in the given query is utilized in the given query;

determining, by the one or more processors, based on at least one performance benchmark of the performance benchmarks and based on the analyzing of the given query, that meeting the at least one performance benchmark requires replacing the at least one reference to the LOB with a reference to one or more implicit columns, wherein the determining that meeting the at least one performance benchmark requires replacing the at least one reference to the LOB with the reference to one or more implicit columns comprises applying the trained classifier for the determining;

generating, by the one or more processors, the one or more implicit columns, the one or more implicit columns comprising a portion of the LOB relevant to the given query;

executing, by the one or more processors, the given query, wherein the executing comprises the given query referencing the one or more implicit columns to obtain query results for the given query; and returning, by the one or more processors, the query results.

15. The computer system of claim 14, the method further comprising:

generating, by the one or more processors, the one or more implicit columns, the one or more implicit columns comprising a portion of the LOB relevant to the given query.

16. The computer system of claim 15, wherein the analyzing the given query comprising determining that the LOB is involved in a sort and the portion of the LOB relevant to the given query comprises an inline portion of the given query.

17. The computer system of claim 15, wherein the analyzing the given query comprises determining that the LOB is involved in one or more functions and the portion of the LOB relevant to the given query comprises results of the one or more functions.

18. A computer program product for planning and executing a query referencing a large object (LOB) in a database system, the computer program product comprising:

one or more computer readable storage media and program instructions collectively stored on the one or more computer readable storage media readable by at least one processing circuit to:

train a classifier, the training comprising:
building an implicit column usage knowledge base, the building comprising:
obtaining sample data comprising query strings referencing the LOB for different usages and query strings that do not reference the LOB;
iteratively executing the query strings as a background processes;
outputting, based on the iteratively executing, query string results comprising the performance benchmarks; and
retaining the query string results in the implicit column usage knowledge base; and
applying at least one machine learning algorithm to the implicit column usage knowledge base to train the classifier, wherein based on the machine learning, the classifier is the trained classifier;

obtain a given query for execution in the database system, wherein the given query comprises at least one reference to the LOB;

obtain, by the one or more processors,-statistics and activities performed in the database system;

establish performance benchmarks for executing queries in the database system based on analyzing the statistics and the activities to set performance;

analyze the given query to determine how the LOB in the given query is utilized in the given query;

determine based on at least one performance benchmark of the performance benchmarks and based on the analyzing of the given query, that meeting the at least one performance benchmark requires replacing the at least one reference to the LOB with a reference to one or more implicit columns, wherein determining that meeting the at least one performance benchmark requires replacing the at least one reference to the LOB with the reference to one or more implicit columns comprises applying the trained classifier for the determining;

execute the given query, wherein the executing comprises the given query referencing the one or more implicit columns to obtain query results for the given query; and return the query results.

* * * * *